US005938948A

United States Patent [19]

Oros et al.

[11] Patent Number: 5,938,948

[45] Date of Patent: Aug. 17, 1999

[54] PLASMA ARC SPOT WELDING OF CAR BODY STEELS CONTAINING VAPORIZABLE INGREDIENTS

[75] Inventors: Alvin Kenneth Oros, Farmington Hills; Jay C. Chennat, Ann Arbor, both of Mich.; Yoshihiro Yamaguchi, Kagashi, Japan

[73] Assignee: Ford Global Technologies, Inc., Dearborn, Mich.

[21] Appl. No.: 08/897,587

[22] Filed: Jul. 21, 1997

[51] Int. Cl.[6] .................... B23K 10/00

[52] U.S. Cl. .................... 219/121.46; 219/121.45; 219/121.59; 219/121.55

[58] Field of Search .................... 219/137 R, 121.45, 219/121.46, 121.54, 121.57, 121.59, 75, 121.51, 121.55

[56] References Cited

U.S. PATENT DOCUMENTS

| | | | |
|---|---|---|---|
| 3,969,603 | 7/1976 | Boughton et al. | 219/121.46 |
| 4,023,006 | 5/1977 | West et al. | 219/121.46 |
| 4,162,389 | 7/1979 | Shimdada et al. | 219/121.47 |
| 5,225,654 | 7/1993 | Harwig et al. | 219/121.46 |
| 5,466,905 | 11/1995 | Flowers et al. | 219/121.46 |
| 5,734,144 | 3/1998 | Yamaguchi et al. | 219/121.46 |

FOREIGN PATENT DOCUMENTS

| | | | |
|---|---|---|---|
| 0068156 | 4/1985 | Japan | 219/121.46 |

*Primary Examiner*—Mark H. Paschall
*Attorney, Agent, or Firm*—Joseph W. Malleck

[57] ABSTRACT

Method of one side spot welding of a metallic auto body construction containing vaporizable coatings or ingredients, the construction having overlapping metal plys, comprising: impinging a plasma column on a selected spot of one side of the construction, the plasma column being generated by passing a plasma gas at a predetermined flow rate through an electrical arc created by a predetermined electrical current path; shielding the plasma column in an inert gas containing at least 5–35% by volume of oxygen, the shielded plasma column melting at least the metal on one ply at the spot while the oxygen increases the fluidity and wetablility of the melted metal and reduce its surface tension allowing any vaporization of the ingredients to quiescently escape through the molten metal; and ceasing plasma arc impingement for allowing the molten metal to solidify and complete the spot weld.

7 Claims, 5 Drawing Sheets

PLASMA ARC SPOT WELDING OF CAR BODY STEELS CONTAINING VAPORIZABLE INGREDIENTS

TECHNICAL FIELD

This invention relates to the technology of welding car body constructions, and more particularly to welding car body constructions from one side while achieving sound welds of steels containing vaporizable ingredients, such as zinc coated plates, and avoiding shortened torch life.

DISCUSSION OF THE PRIOR ART

Resistance spot welding is used most frequently for car body constructions; the number of resistance spot welds for one car body is usually more than 4000 (as can be visualized in FIG. 1A). Resistance spot welding requires access from both sides of the joint; this limits design options, and often requires weld joint access holes 50 to complete the weld (as shown in FIG. 1B and FIG. 1C). As a result, the size and weight of parts must be increased to compensate for the material lost and stiffness reduction caused by the access holes. One side body welding can overcome these disadvantages. One side welding has been carried out by the use of laser or plasma, each of which creates a molten pool of metal in the most adjacent plate to be welded, which pool then conducts heat to the next adjacent plate to melt a slightly smaller spot; freezing of the merged molten spots creates the weld joint therebetween. One side plasma arc welding is more desirable because it involves lower investment and operating cost, is simpler to operate and maintain, and does not require a safety enclosure.

It is difficult to create a sound effective spot weld from one side in material containing vaporizable ingredients, such as steel coated with zinc as electro galvanized or hot dipped galvanized steel. Zinc will boil at temperatures well below the melting point of the steel (such as at 900° C. vs. 1500° for melting of the steel). Zinc vapor must escape through the interface of the molten pool during welding, unless there is a gap between the plates and interface, such gap is usually not present and, if present, needs careful control in production which is difficult to achieve. Therefore, the zinc vapors usually do not have a convenient escape path and abruptly explode to create an exit through the molten pool. There is no convenient access for the vaporized zinc to escape since the molten steel has very high surface tension, low fluidity and low wetability; these characteristics impede any migration of the vapors. An explosion of the molten steel pool leaves behind voids in the weld joint which is a serious defect and such exploded zinc vapor may cause contaminants to stick to the welding gun nozzle and reduce its operating life.

SUMMARY OF THE INVENTION

It is an object of this invention to provide an improved method for one side spot welding of steels with vaporizable coatings or ingredients, while employing a plasma arc to carry out the welding.

The method of this invention that fully meets the above object, is a method of one side spot welding of a metallic auto body construction containing vaporizable coatings or ingredients, the construction having overlapping metal plys, comprising: (i) impinging a plasma column on a selected spot of one side of the construction, the plasma column being generated by passing a plasma gas at a predetermined flow rate through an electrical arc created by a predetermined electrical current path; (ii) shielding the plasma column in an inert gas containing at least 5–35% by volume of oxygen, the shielded plasma column melting at least the metal on one ply at the spot while the oxygen increases the fluidity and wetability of the melted metal and reduce its surface tension to allowing any vaporization of the ingredients to quiescently escape through the molten metal; and (iii) ceasing plasma arc impingement for allowing the molten metal to solidify and complete the spot weld.

Advantageously the arc current can be controlled to be initially low, for a period to allow the plasma column to force a molten pool radially outwardly and through the most adjacent first ply; the current should then be increased for the remainder of the welding cycle while the plasma flow rate is reduced. It is further advantageous to reduce the arc current during the last phase of the welding cycle to eliminate any residual vaporized ingredient in the weld joint; after cessation of the plasma column, it is preferable to substitute a reducing gas for oxygen containing shielding gas following completion of the weld cycle.

DETAILED DESCRIPTION AND BEST MODE

Figure 1A:
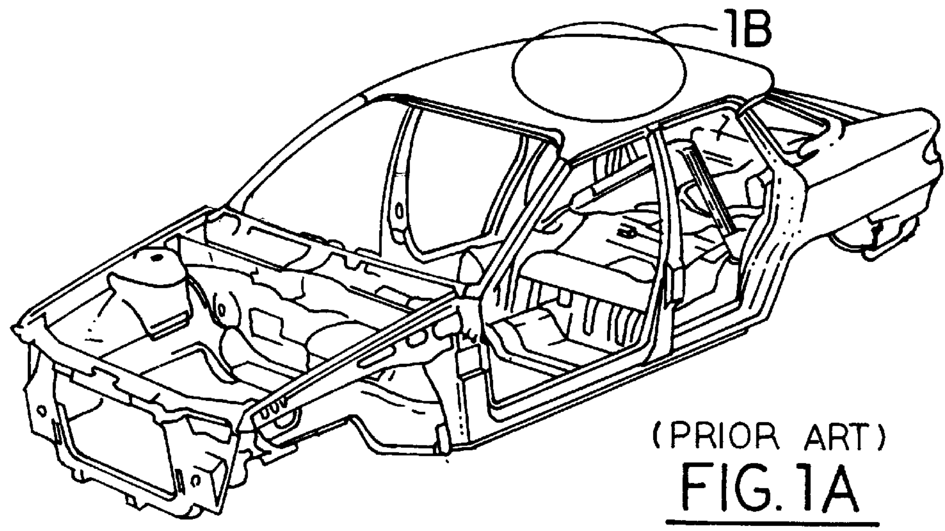
FIG. 1A is a perspective view of a typical prior art body construction illustrating the number of joints that must be welded.
Figure 1B:
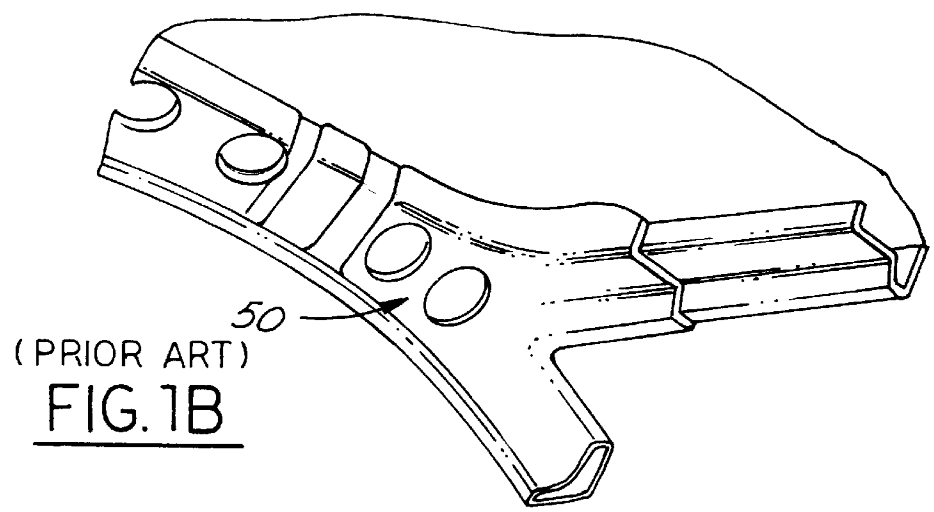
FIG. 1B is an enlarged view of portions of the interior of the construction in FIG. 1A illustrating the need for access holes to complete welding.
Figure 1C:
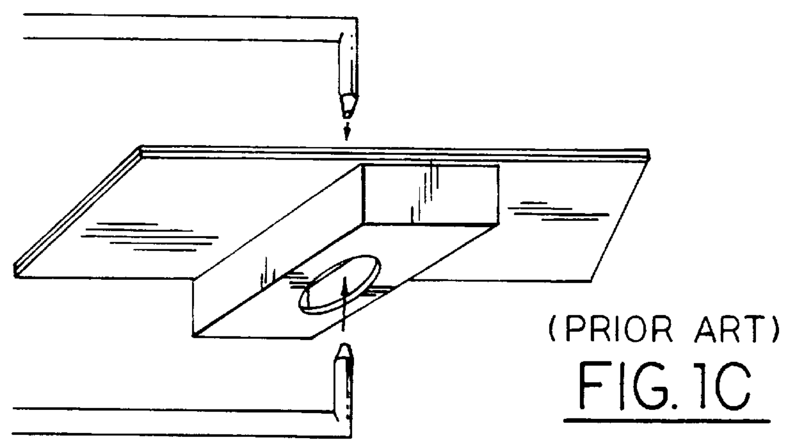
FIG. 1C is a schematic illustration of how resistance welding is carried out by the prior art using access holes.
Figure 2A:
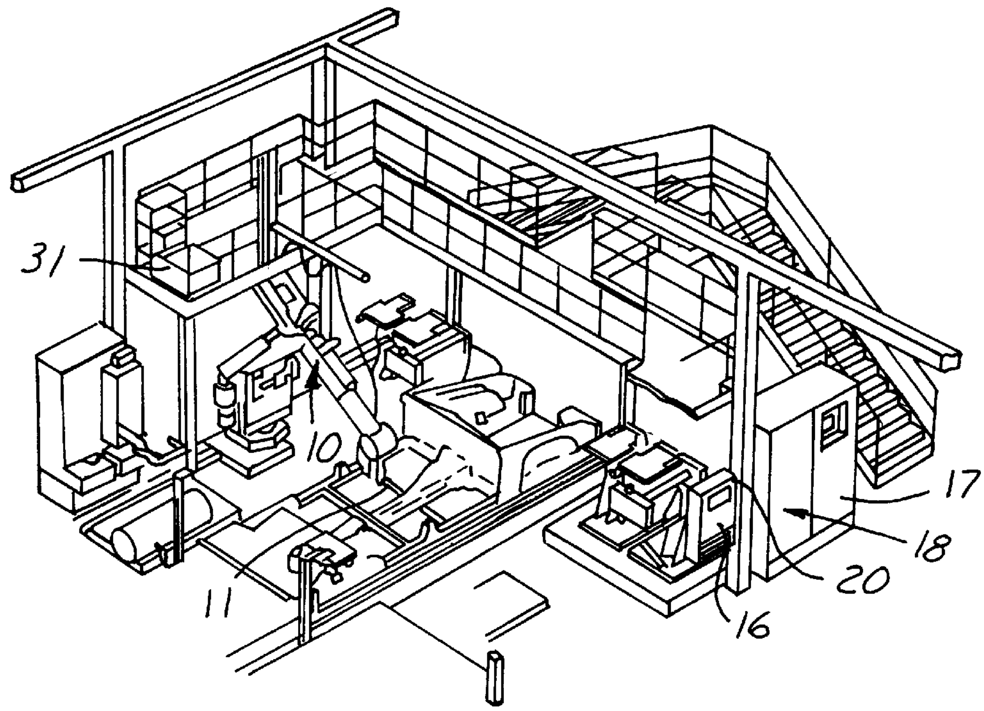
FIG. 2A is a perspective view of an auto body construction that is undergoing one side plasma arc spot welding in accordance with this invention.
Figure 2B:
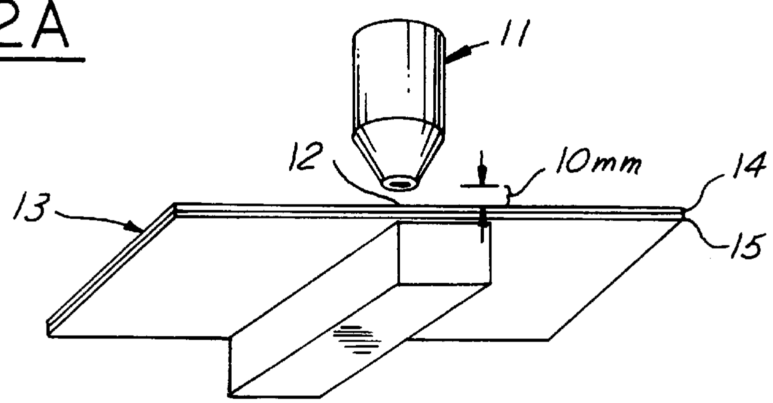
FIG. 2B is an enlarged schematic perspective diagram of a portion of the body construction of FIG. 2A showing the relation of a plasma arc gun relative to overlapped plates of the construction that no longer require cut out access holes to facilitate welding.

As shown in FIGS. 2A–2B, robot 10 is programmed to move the plasma welding head 11 to a position about 10 mm from the spot weld target 12 on a construction 13 comprised of overlapping plates, panels or plys 14, 15. The head 11 advances to contact the most adjacent ply 14 and applies sufficient force to bring the assembly 13 of plys in contact with each other (50–200 lbs). The weld sequence required is selected by a robot control program stored in an interface unit 16 of a welding console 18. This unit may have the capability to select at least 9 different combinations of weld current and weld time, to suit different welding conditions. On receiving the "end of weld" signal, the head 11 is retracted and the robot is free to move on to the next spot weld target. The power supply 17 for the welding head converts incoming AC electrical supply to a controlled DC welding supply. Using the frequency inverter principle, it provides a fast controlled response for a smooth, controlled welding arc. The welding console 18 functions include the following: plasma and shield gas flow regulation and monitoring, pilot arc initiation, electrical current control interpretation between the plasma interface and the power supply, and coolant monitoring. The console further includes a weld sequencer 20 with solid state control modules for accurate control of the variables within a welding operation.

The features of the interface unit 16 include robot selection of channel and pulsar functions, manual programming of channel valves by way of a keypad, display of selected channel and actual pressure, interface of plasma equipment control to/from robot and line controller, and status indicating lights. The pulsar function, which adds a controlled pulse to the output current, is used particularly when welding zinc coated material. The weld sequencer controls the sequencing and timing functions for the plasma spot weld program. A microprocessor based unit of the sequencer 20 provides the user with a selection of menus; its functions include all weld sequencing operations, offering greater flexibility and includes a disc drive for storage of weld programs and actual weld results.

Figure 4:
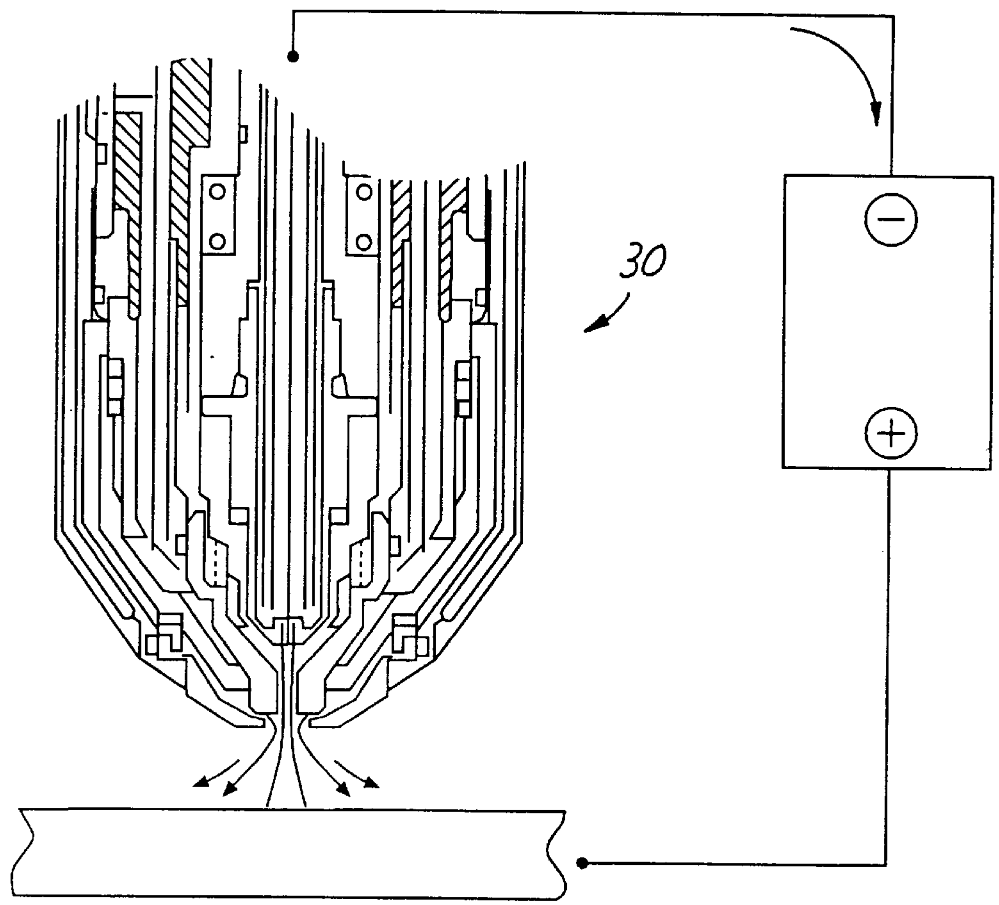
FIG. 4 is an enlarged central sectional view of a nozzle used in plasma arc welding.

As shown in FIG. 4, the welding head 11 may comprise a torch integrated into a specially designed pneumatic cylinder assembly. The cylinder assembly movement brings the end of the plasma head, called the shield cup 23 in contact with (or close thereto) the top ply or panel 14. The head 11 may also include proximity switches for detection of cylinder assembly movement, a pneumatic valve for cylinder operation and a terminal box for control signaling. The welding head is mounted to a gun change plate; this allows the gun to be exchanged within a certain cycle time. Air and electrical control services pass through the change plate. The plasma services include water in, water out, electrical power, shield gas and plasma gasses, all permanently connected to the gun. The changing of plasma torch nozzle can be instigated by way of a push button that shuts the plasma system down, drains the water and brings the robot to a convenient position.

The welding system uses its own coolant recirculator 31. The use of deionized water is required to prevent the establishment of electrolysis in the plasma head. The feeding of the welding services from the welding console to the plasma head is easier with the units mounted above the robot. These welding services cannot be routed through a quick change system, therefore a boom tracking system supervises the services between the console and robot head. Plasma and shielding gasses are supplied from a manifold system local to the line. Auto start and end of shift procedures are controlled with the programmed line controllers for the correct sequencing of the gasses, water, pilot arc and main arc controls. Plasma gas, shielding gas and water flows are constantly monitored, with auto shut off if a default is detected. If the main arc cannot be initiated or the end of weld signal is not given, the system attempts to perform another weld in the same position. If the retry fails, then a fault is flagged, thereby preventing missed welds.

The plasma arc welding system of this invention needs access from one side only to effect the weld. This is highly advantageous because not only is robotic repositioning much easier and quicker, there is no need for access holes in the construction where beams or channels enclose a joint area (see FIG. 2B); the construction no longer needs an increase in size and weight to compensate for the material loss and stiffness reduction caused by such access holes.

Figure 2C:
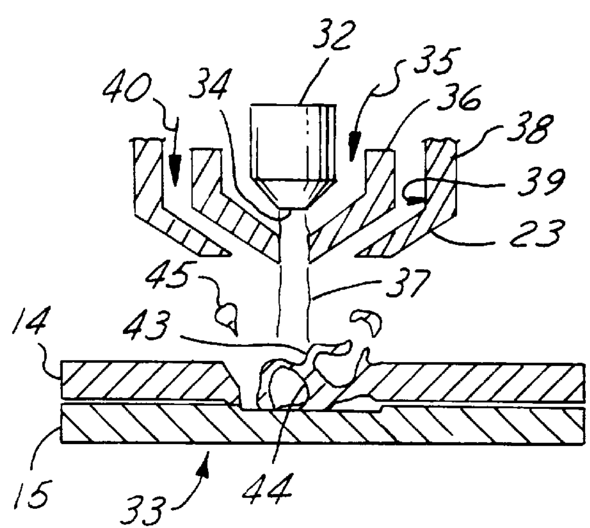
FIG. 2C is a cross-sectional elevational view of a schematic plasma arc gun being used in the process of heating galvanized steel, the illustration showing the disruptive effect of boiling zinc when certain features of this invention are not employed.

As schematically shown in FIG. 2C the plasma torch nozzle is comprised of a central electrode (anode) 32 which is designed to be oriented normal to the surfaces of the assembly (connected as a cathode) to be welded. The arc is generated between the electrode 32 and the work piece or assembly 33. The plasma arc is constricted by a nozzle assembly which extends down about the electrode and extends a slight distance further than the tip 34 of the electrode. The plasma is created by passing a plasma gas 35 down between the electrode 32 and the interior of the nozzle part 36 which gas, when it passes through the electrical arc established from the electrode, is sufficiently ionized to conduct an electrical current and thus become a plasma. By the use of a constricting nozzle 36, a high intensity columnar plasma beam 37 is produced. The result is a stable and controllable high temperature plasma. The gun or torch additionally possesses a shield cup 38 which is spaced from the outer surface of the nozzle part 36 and has a terminal portion which preferably contacts the assembly 33 during the weld cycle. The space between the shield cup and the nozzle provides a channel 39 through which a shielding or shrouding gas 40 is passed to protect the molten pool of metal (that is being generated by the welding cycle) from oxidation.

The electrode 32 is preferably constructed of tungsten and is secured inside the torch behind the orifice of the nozzle and thereby is protected from external impurities that would normally attack the electrodes very high temperature surface. This arrangement greatly increases the electrode life over other arc welding processes. Unlike TIG or MIG welding processes, plasma arc welding does not require the use of high frequency arc initiation. Plasma arc ignition is achieved by a pilot arc which remains on at all times. High frequency is only required for the initial pilot arc striking. The fact that high frequency is only used once per shift avoids potential problems of high frequency interference with respect to electronic hardware that controls the robot or other aspects of the welding system.

The shield cup 38 is constructed to withstand a combination of heat and indentation. The cup can easily be replaced as a consumable item. Water cooling of the gun or torch can be provided by channels 42 (shown in FIG. 4). The size of the welding gun or head 11 is smaller. Most robots for welding auto body constructions have a weight limit for the welding gun (or torch) that should not exceed 100 kg; many parts of the body construction have box channels or shapes that necessitate a resistance welding gun to have such a size that it would have to exceed such robot weight limit.

Vaporizable materials that are present as a coating or present within the sheet steel itself can cause explosions by boiling at a lower point than the melting point of the work piece material. For example (as shown in FIG. 2C) zinc boils at 900° C. whereas steel, that is to be welded, melts at a temperature of 1500° C. Therefore, when a molten pool 43 is created on the top ply or plate 14 (while carrying out spot welding), the zinc is vaporized and attempts to escape with much difficulty through the interface or molten pool. The pressure of the zinc vapor builds into large pockets or bubbles 44 and then eventually blows off the molten pool in an explosion. Such explosion leaves behind a void in the weld joint, a serious defect and the exploded molten metal 45 tends to stick to the nozzle or electrode of the plasma torch seriously shortening the life of the torch or nozzle.

Figure 3A:
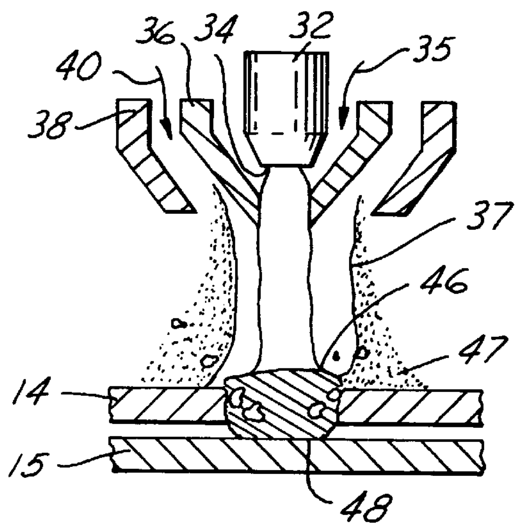
FIGS. 3A–3C are a series of sectional elevational diagrammatic views illustrating how plasma arc welding, in accordance with this invention effects welding without disruption by vaporized ingredients.
Figure 3B:
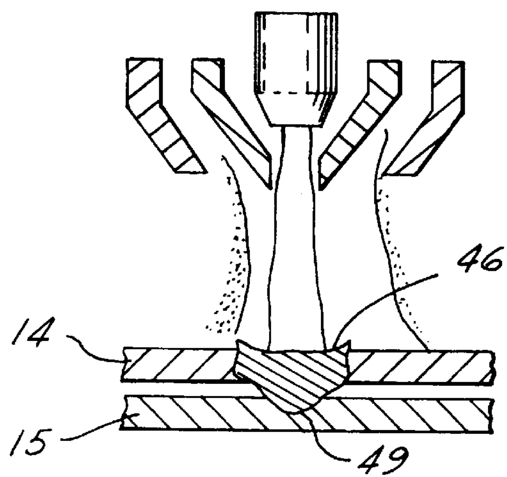
Figure 3C:
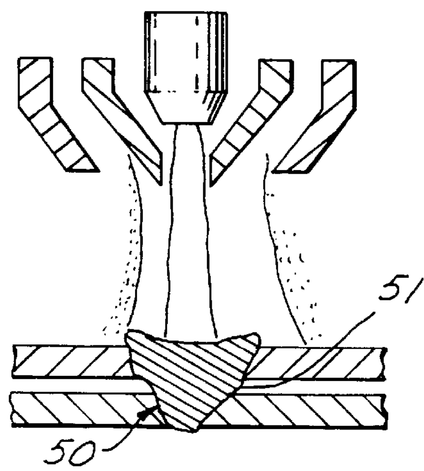

A critical feature of this invention is the addition of oxygen during a preselected part or during all of the welding cycle to reduce the surface tension of the molten steel or material that is being welded and increase the molten materials fluidity and wetability. As shown in FIGS. 3A–3C, plasma arc welding is achieved by burning through the top plate or ply 14 to form a puddle of weldment 46 from one side of the assembly. This eliminates the restriction of other welding processes that would require accurate torch to joint relationship; although the torch touches the assembly, the robot is not required to make contact with the assembly which thus avoids thickness height variation which are so necessary in resistance welding. The system of this invention can weld multiple plys or thicknesses, even up to 4 panels, which is not tolerable with resistance welding. Accordingly, as shown in FIG. 3A, the top ply is heated by the plasma column 37 and the molten pool 46 is created. The molten pool becomes bigger and is pushed downwardly by the plasma gas or jet 35 to contact the bottom ply 15 plate. To permit migration of zinc vapor through the molten pool, adequate oxygen must be present in the shield gas 40 to reduce the surface tension of the molten puddle and increase its fluidity and wetabilty (characteristics which allow the zinc vapor to escape while the molten puddle remains adhered to the panel or plate). No zinc vapor bubble growth takes place and thus there is no explosive condition. Instead many very small or tiny bubbles form in the molten pool and may migrate outwardly as a fine spray 47 of weld material leaving the puddle.

As shown in FIGS. 3A and 3B, the bottom plate is heated by conduction (at 48) from the molten pool which has pushed its way into contact therewith. Heat builds up in a smaller spot within the bottom plate 15 and is melted. The weld puddle 46 gets slightly bigger in the top plate 14, while the bottom plate is progressively melting through at 49. As shown in FIG. 3C, when a sufficient nugget 50 is melted in the bottom plate, the plasma arc and column is shut off and the molten metal allowed to freeze to form a solid weld joint 51.

Figure 5:
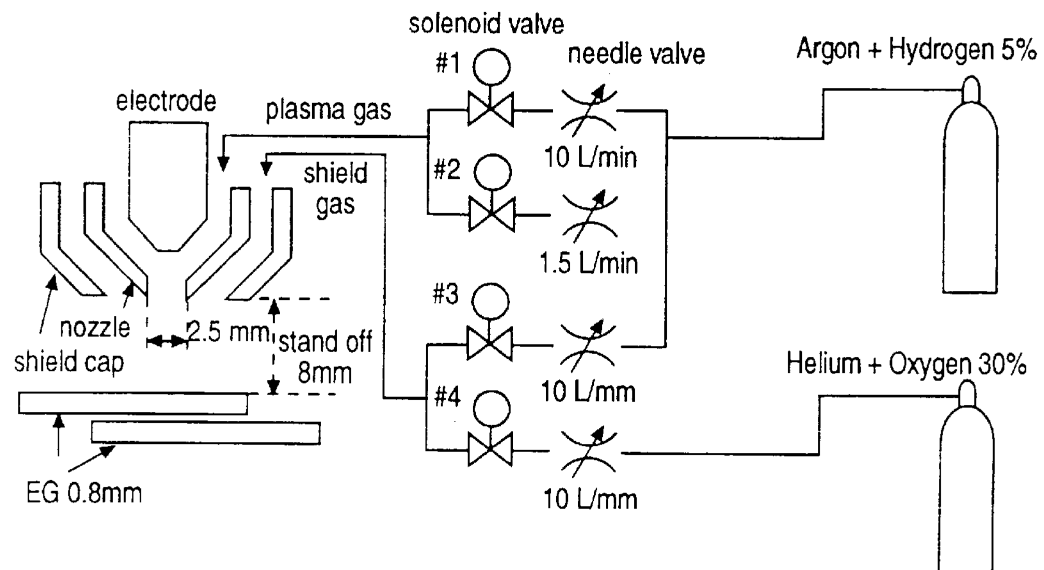
FIG. 5 is a schematic illustration of the controls for the welding torch of this invention, that permit the regulation and administration of plasma and shielding gasses in a selective manner.
Figure 6:
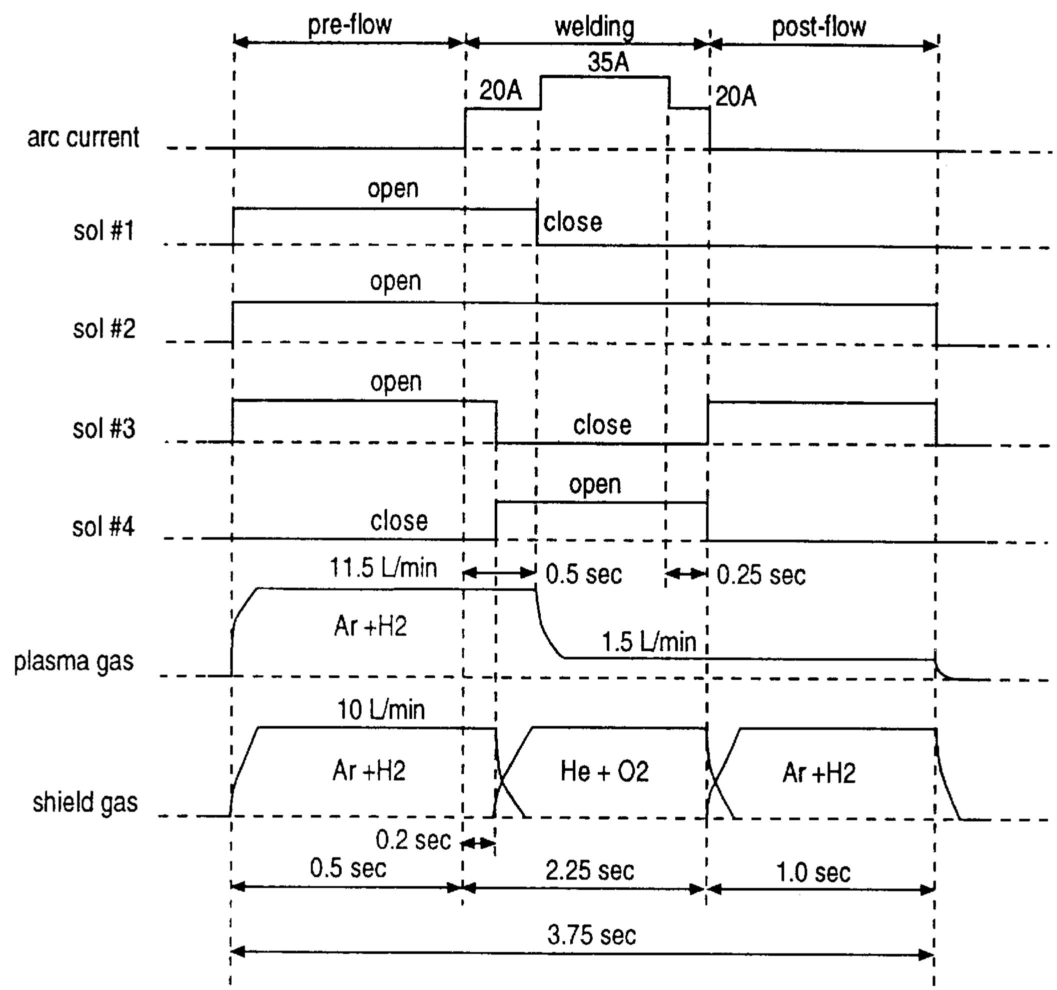
FIG. 6 is a time chart illustrating one example of how the plasma and shielding gasses can be controlled by solenoid valves and actuated in timed relation to the variance of arc current to provide different conditions during pre-welding, welding and post welding phases.

Even though oxygen has reduced the surface tension in the puddle, the very fine bubble may permit a slight accumulation of small spatter on the nozzle which, over a longer period of time, may adversely effect the nozzle performance. Turning to FIGS. 5 and 6, gas and current controls are used to remedy this problem. To minimize the small bubble spatter, certain parameters can be observed at the beginning or preflow before the welding cycle. These parameters include use of a strong flow of plasma gas (about 20 liters/minute) in a time period of about 0.5 seconds through the plasma channel as well as through the shield gas channel. At the same time a small arc current is utilized (about 10 amps) for this shortened period of 0.5 seconds. When the weld cycle starts, the plasma gas flow is sustained at 20 liters per minute and the arc current increased to 20 amps for 0.5 seconds. The strong flow of plasma gas forces the molten metal of the puddle to flow outwardly and thus carry any spatter to the outside away from the nozzle; the small arc current additionally reduces the amount of small bubble spatter. During the first 0.2 seconds of the weld cycle, no oxygenated shield gas enters the nozzle.

After 0.2 seconds of the weld cycle, the $Ar+H_2$ shield gas flow rate is advantageously reduced and then at 0.5 seconds into the weld cycle, the plasma gas flow rate is reduced further to about 1.5 liters per minute thereafter. Concurrently, the oxygenated shield gas is introduced through the shield gas channel at a flow rate of about 10 liters per minute. The arc current at the same time is increased to 35 amps. The molten pool is thus prevented from being blown off and the increase in arc current obtains adequate size for the molten pool. To avoid having some small zinc vapor bubbles left in the weld joint, the arc current is not shut down suddenly, but rather it reduced back to the 20 amp level for a period of about 0.25 seconds just before the weld cycle is completed. This results in excellent weld appearance without blow holes. To carry out these timed controlled functions of the plasma and shield gas with different compositions and flow rates and differing electric current, FIG. 5 illustrates the solenoid valves utilized in carrying out these functions. FIG. 6 further depicts as an example how one program may be utilized to effect these different functional considerations.

Plasma spot welds are longer in time than resistance welds, having a nugget diameter typically of 7 mm compared to 4 mm for a resistance spot weld. However, the full welding cycle time for plasma arc welding is longer than for an equivalent resistance spot weld, the time being about 2.25 seconds compared to 1.1 seconds for resistance welding (a twofold increase in time). The impact of slightly longer weld times is offset by quicker positioning of the torch since less manipulation is required and no gun retraction is required.

Some molten metal may get oxidized during the plasma arc welding sequence of this invention; this is controlled to a tolerable level by controlling the time duration of shield gas usage during the weld cycle. A reducing shield gas containing hydrogen, is admitted through the shield gas channel is used initially for about 0.2 seconds of the weld cycle and again after the completion of the weld cycle.

The use of the oxygenated shield gas during critical periods of the welding, provides much longer consumable electrode light, reliable arc starting, controlled penetration, high welding speed, and is highly repetitive in automated welding.

Figure 7:
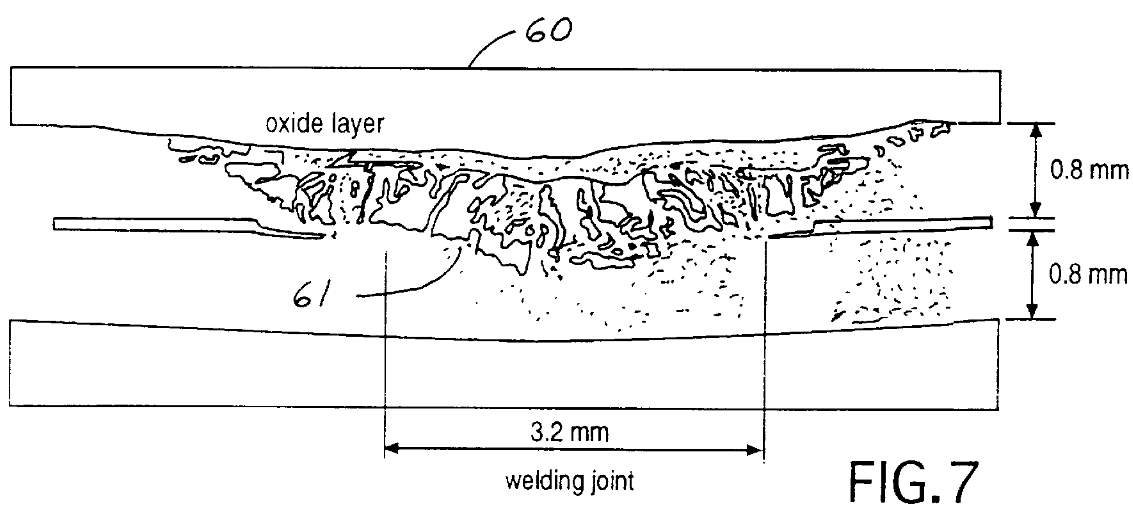
FIG. 7 is a microphotograph (100×) of a section of a spot weld joint made in accordance with this invention.

The excellent weld created by the practice of this invention is shown in FIG. 7. This is a microphotograph of a cross section of a plasma spot weld of electro galvanized steel. There is a narrow oxide layer 60 at the top surface of the spot weld, and the interface area is free of oxides; weld integrity is maintained with tensile strength of more than 304 kgf (2990N). If welding time is set at more than 2 seconds, plasma spot welding strength will be equal to or better than spot welds.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. Method of one side spot welding of a metallic auto body construction having construction having superimposed metal plys with vaporizable coatings or ingredients, the construction having overlapping metal plys, comprising:

(a) implying a plasma column on a selected spot of one side of said construction having vaporizable coatings or ingredients, said plasma column being created by passing a plasma gas at a predetermined flow rate through an electrical arc created by a predetermined electrical current path;

(b) shielding said plasma column in an inert gas containing at least 5–30% by volume oxygen, said shielded plasma column melting at least the metal of one ply at said spot while the oxygen increases the fluidity and wetability of the melted metal and reduces its surface tension allowing any vaporization of the ingredients to quiescently escape through the molten metal; and (c) ceasing plasma arc impingement for allowing the molten metal to solidify and complete the spot weld.

2. The method as in claim 1, in which said plasma arc current is initially low for a period of about 0.5 seconds to allow the plasma arc column to force the molten pool radially outwardly and thence through the first ply, and concurrently the arc current is increased while the plasma flow rate is reduced during the remainder of the plasma welding.

3. The method as in claim 2, in which the arc current is reduced during the last 0.25 seconds of impingement of the plasma column.

4. The method as in claim 1, in which after cessation of the plasma arc column, a reducing shield gas is substituted for said oxygen.

5. The method as in claim 1, in which said shielding gas is selected from argon and helium.

6. The method as in claim 1, in which argon is selected as the principal shielding gas containing oxygen in a volume amount of 25–35%.

7. The method as in claim 1 in which helium is selected as the shielding gas containing oxygen in a volume amount of 10–25%.

* * * * *